United States Patent
Hirano et al.

(10) Patent No.: US 6,872,488 B2
(45) Date of Patent: Mar. 29, 2005

(54) STORAGE BATTERY

(75) Inventors: Tatsuya Hirano, Osaka (JP); Tadashi Tanaka, Osaka (JP)

(73) Assignee: Miyagawa Kasei Industry Co., Ltd., Osaka (JP)

( * ) Notice: Subject to any disclaimer, the term of this patent is extended or adjusted under 35 U.S.C. 154(b) by 343 days.

(21) Appl. No.: 10/057,509

(22) Filed: Jan. 25, 2002

(65) Prior Publication Data

US 2003/0044679 A1 Mar. 6, 2003

(30) Foreign Application Priority Data

Aug. 31, 2001 (JP) ......................................... 2001-263292

(51) Int. Cl.[7] ........................ H01M 10/48; H01M 2/00; H01M 2/10
(52) U.S. Cl. ........................ 429/91; 429/163; 429/186
(58) Field of Search ........................ 429/91, 186, 163

(56) References Cited

U.S. PATENT DOCUMENTS

| | | |
|---|---|---|
| 1,012,298 A | 12/1911 | Tormin |
| 4,076,906 A * | 2/1978 | Jensen ........................ 429/90 |

FOREIGN PATENT DOCUMENTS

| | | |
|---|---|---|
| EP | 0299670 | 1/1989 |
| JP | 51-114641 | 10/1976 |
| JP | 52-114235 | 8/1977 |
| JP | 52-119013 | 9/1977 |
| JP | 02008859 | 1/1990 |

* cited by examiner

Primary Examiner—Patrick Ryan
Assistant Examiner—Julian Mercado
(74) Attorney, Agent, or Firm—W. F. Fasse; W. G. Fasse

(57) ABSTRACT

A storage battery includes a battery casing, a cover closing an opening of said battery casing, and a thinner see-through window portion provided on a sidewall of battery casing for visual recognition, from the outside, of a level of electrolyte contained in battery casing. A rib for reinforcement is provided at see-through window portion.

13 Claims, 5 Drawing Sheets

STORAGE BATTERY

BACKGROUND OF THE INVENTION

1. Field of the Invention

The present invention relates to a storage battery, and more particularly to a structure of a battery casing having a thinner, see-through window portion for visual recognition of a level of electrolyte from the outside.

2. Description of the Background Art

Electrolyte is contained in a battery casing of a storage battery. Conventionally, there existed a storage battery having a thin-walled see-through window portion provided at a battery casing for visual recognition of a level of electrolyte from the outside. In FIG. 6, an exemplary storage battery with a conventional see-through window portion is shown.

As shown in FIG. 6, a storage battery 1 has a battery casing 3, a cover 2, and a thin-walled see-through window portion 4 on a sidewall of battery casing 3. Because of such a see-through window portion 4, a level of electrolyte contained in battery casing 3 is visually recognizable from the outside and the amount of the electrolyte can be externally grasped.

When the thin-walled see-through window portion 4 is provided on the sidewall of battery casing 3 as described above, however, material flow is hindered in this part when battery casing 3 is molded, thereby deteriorating the moldability of battery casing 3.

Furthermore, see-through window portion 4 is thin and thus weak in strength, so that see-through window portion 4 easily deforms when battery casing 3 is released from a mold.

SUMMARY OF THE INVENTION

The present invention is made to solve the aforementioned problem. It is an object of the present invention to provide a storage battery with a battery casing having a thinner, see-through window portion, in which a material flow in a portion to be a see-through window portion is promoted at the time of molding, and in addition, the see-through window portion is prevented from deforming when the battery casing is released from a mold.

A storage battery in accordance with the present invention includes a battery casing, a cover closing an opening of the battery casing, and a thinned see-through window portion provided on a sidewall of the battery casing for visual recognition, from the outside, of a level of electrolyte contained in the battery casing, characterized in that the see-through window portion is provided with a reinforcing rib.

By providing the reinforcing rib at the see-through window portion in this way, the see-through window portion is selectively made thicker. Since a material easily flows in such a thicker section at the time of molding, a material flow in a portion to be a see-through window portion is better promoted than in a conventional example. Furthermore, provision of the reinforcing rib can reinforce the see-through window portion, and the strength of the see-through window portion at the time of releasing the battery casing from a mold can be improved.

Preferably, the aforementioned battery casing has a plurality of cells and a partition separating the cells, and a reinforcing rib is provided at a position in alignment with the partition. Therefore, that part of the see-through window portion which extends along the partition can be reinforced, and thus deformation at the time of molding the battery casing can be effectively prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described with reference to FIGS. 1–5.

First Embodiment

Figure 1:
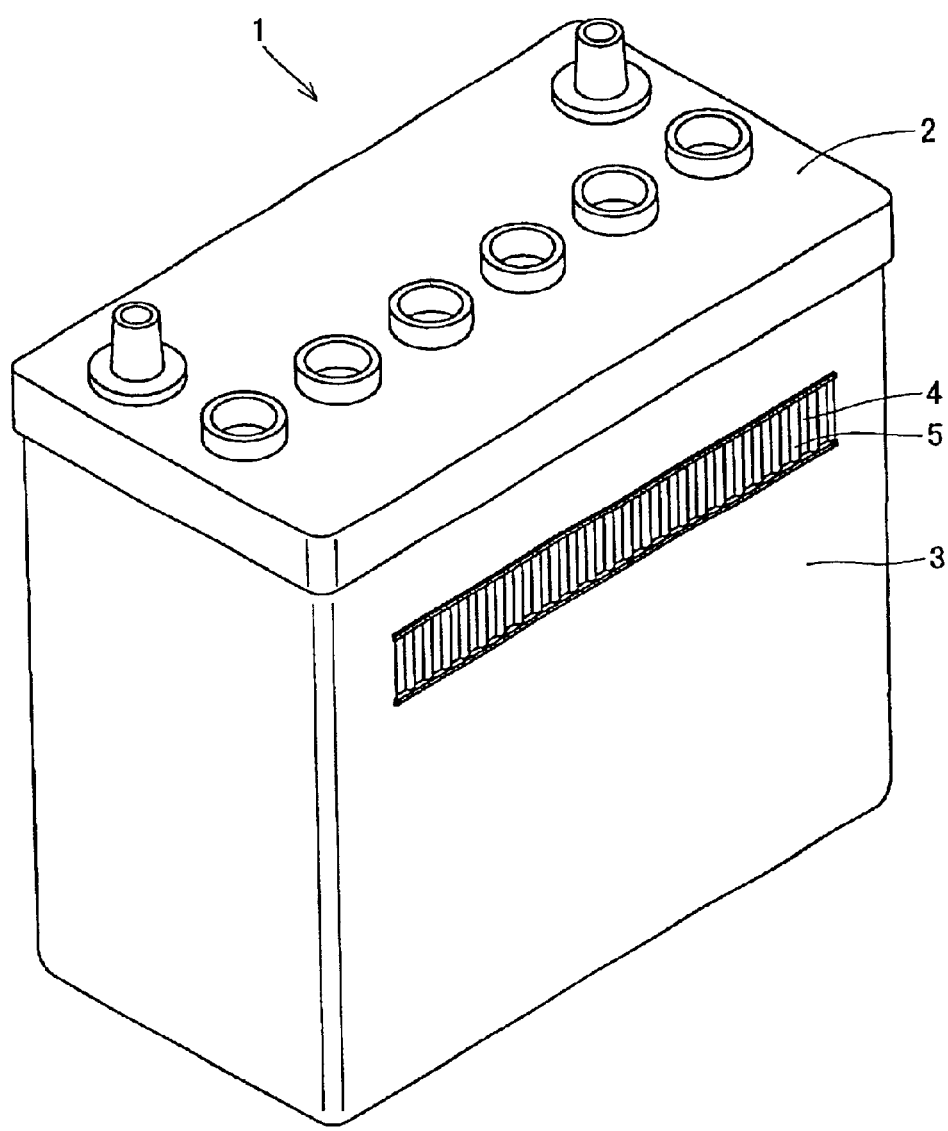
FIG. 1 is a perspective view of a storage battery in accordance with a first embodiment of the present invention.

FIG. 1 is a perspective view of a storage battery 1 in accordance with a first embodiment of the present invention. As shown in FIG. 1, storage battery 1 has a battery casing 3, a cover 2, and a see-through window portion 4 for visual recognition of a level of electrolyte.

Battery casing 3 contains electrolyte, and has a plurality of cells, a partition separating the plurality of cells and a thin-walled see-through window portion 4 on the sidewall thereof. Cover 2 closes an upper end opening, and has a pair of terminals on its upper surface, a plurality of inlet ports and caps attached on the inlet ports.

See-through window portion 4 is provided on the sidewall of battery casing 3 and is formed by selectively reducing the thickness of the sidewall of battery casing 3. By selectively making thinner the sidewall of battery casing 3, the liquid surface of electrolyte can be visually recognized from the outside. Therefore, the level of electrolyte is visually recognizable through the aforementioned see-through window portion 4 from the outside.

In the present invention, see-through window portion 4 of battery casing 3 is selectively provided with a rib (thicker section) 5, as shown in FIG. 1. In the example shown in FIG. 1, a plurality of narrow ribs 5 are provided with regular intervals, and ribs 5 extend parallel to the direction of the height (upward and downward directions) of battery casing 3.

Figure 2:
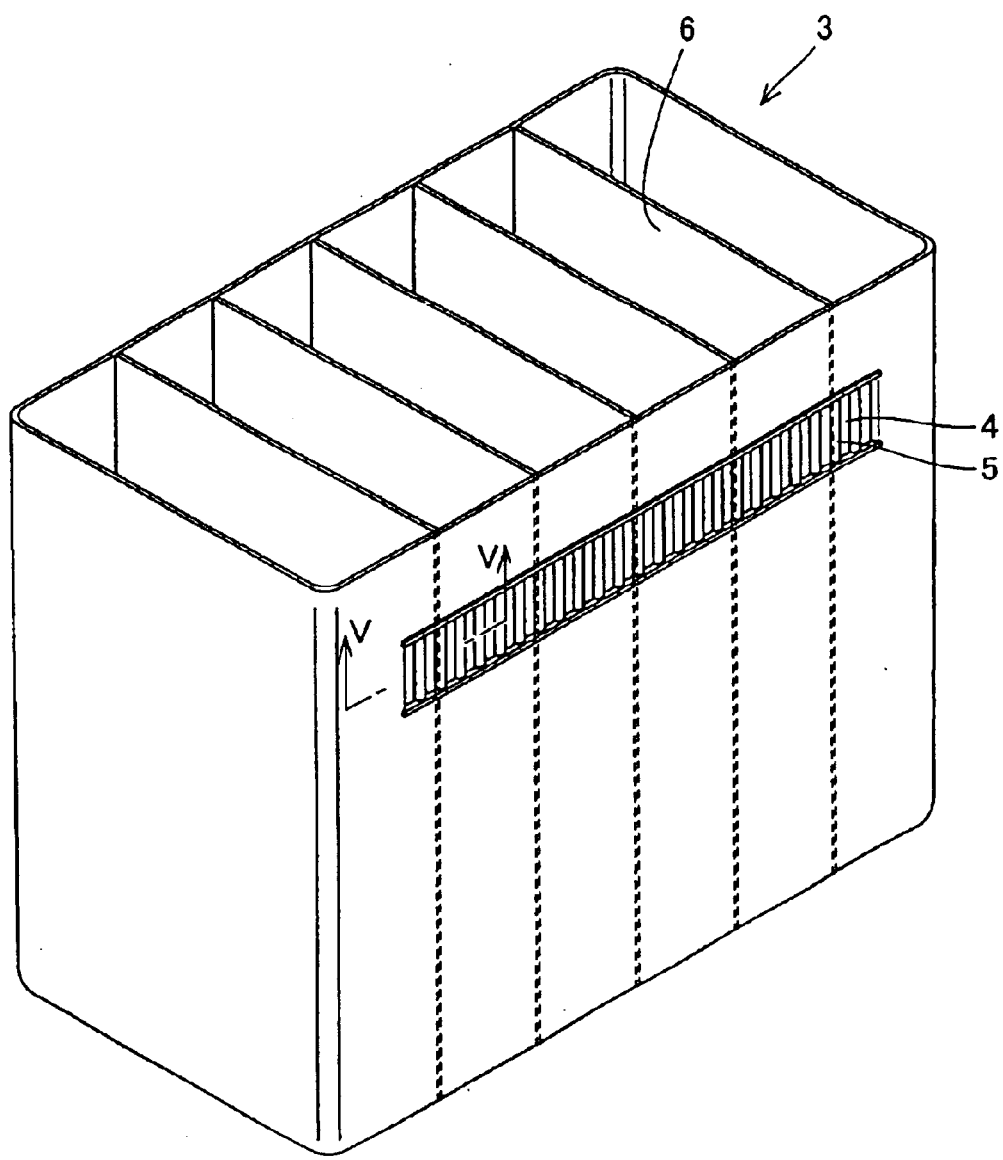
FIG. 2 is a perspective view of a battery casing of the storage battery in accordance with the first embodiment of the present invention.

In FIG. 2, a perspective view of battery casing 3 of FIG. 1 is shown. As shown in FIG. 2, battery casing 3 has a plurality of cells and partitions 6 separating the cells, inside thereof. A part of ribs 5 extend along partitions 6. More specifically, a prescribed rib 5 is arranged in front of partition 6 to be aligned with partition 6, and a connecting portion of partition 6 to see-through window portion 4 is made thicker.

Figure 5:
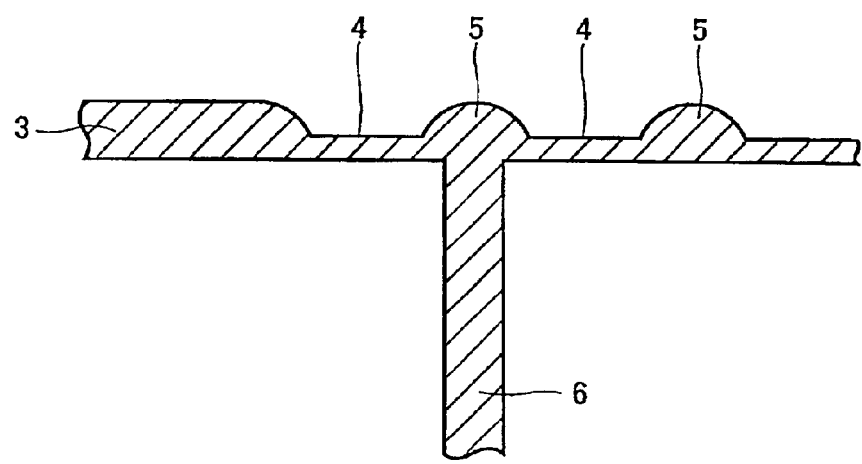
FIG. 5 is a partial cross sectional view along line V—V in FIG. 2.
Figure 6:
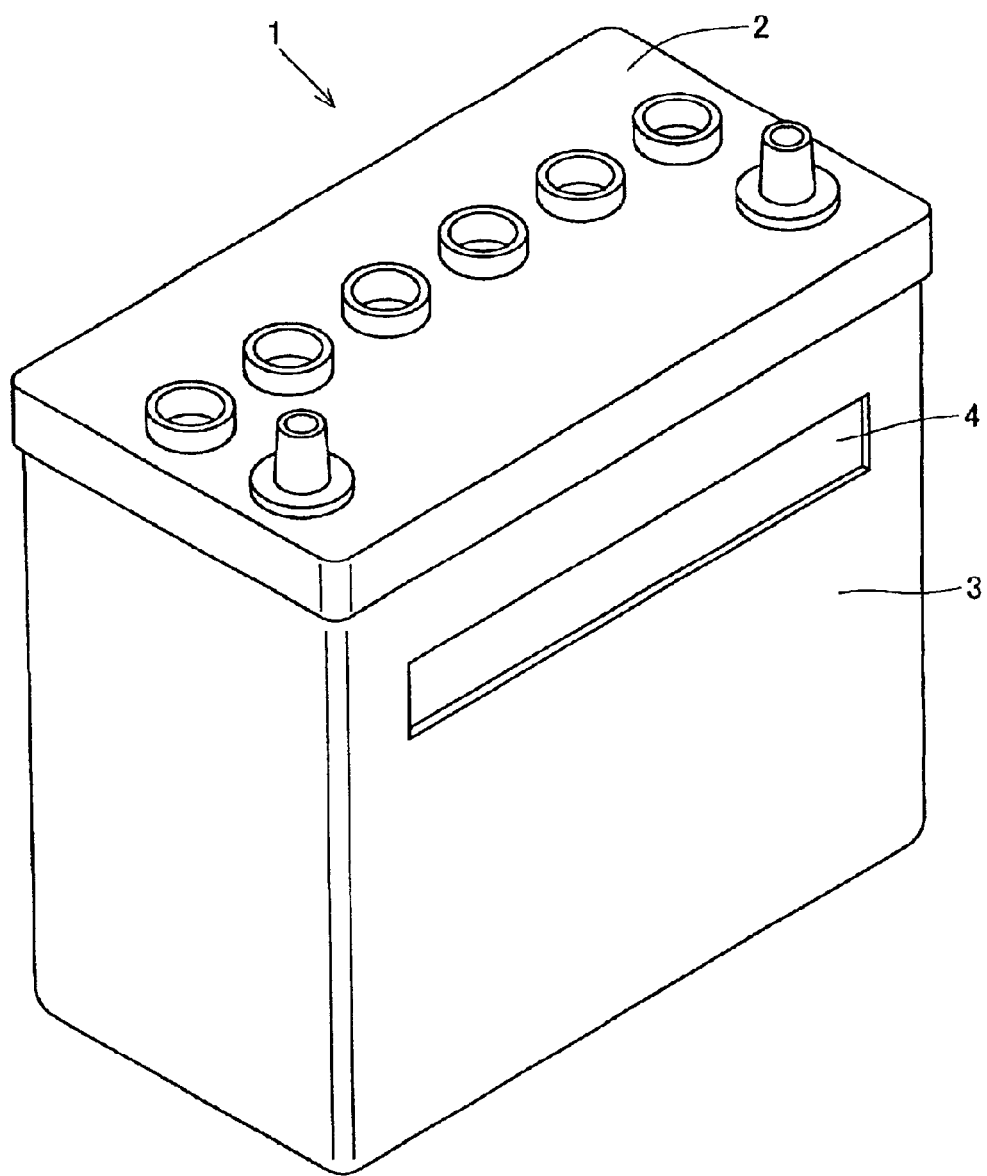
FIG. 6 is a perspective view of a conventional storage battery.

In FIG. 5, a cross sectional view taken along line V—V in FIG. 2 is shown. As shown in FIG. 5, see-through window portion 4 is partially made thicker by providing rib 5. In the example shown in FIG. 5, the thickness of that part of see-through window portion 4 which is provided with rib 5 is approximately equal to the thickness of that part of the sidewall of battery casing 3 which is not provided with see-through window portion 4. Further, a prescribed rib 5 is arranged on partition 6.

Since rib 5 for reinforcement is provided at see-through window portion 4 as mentioned above, see-through window portion 4 is selectively made thicker. In such a thicker section, a material easily flows at the time of molding, and therefore a material flow in a portion to be see-through window portion 4 is better promoted than in a conventional example.

In addition, provision of rib 5 can reinforce see-through window portion 4. Therefore, the strength of see-through window portion 4 at the time of releasing battery casing 3 from a mold can be improved, and deformation of see-through window portion 4 of battery casing 3 when released from a mold can effectively be prevented.

Second Embodiment

Figure 3:
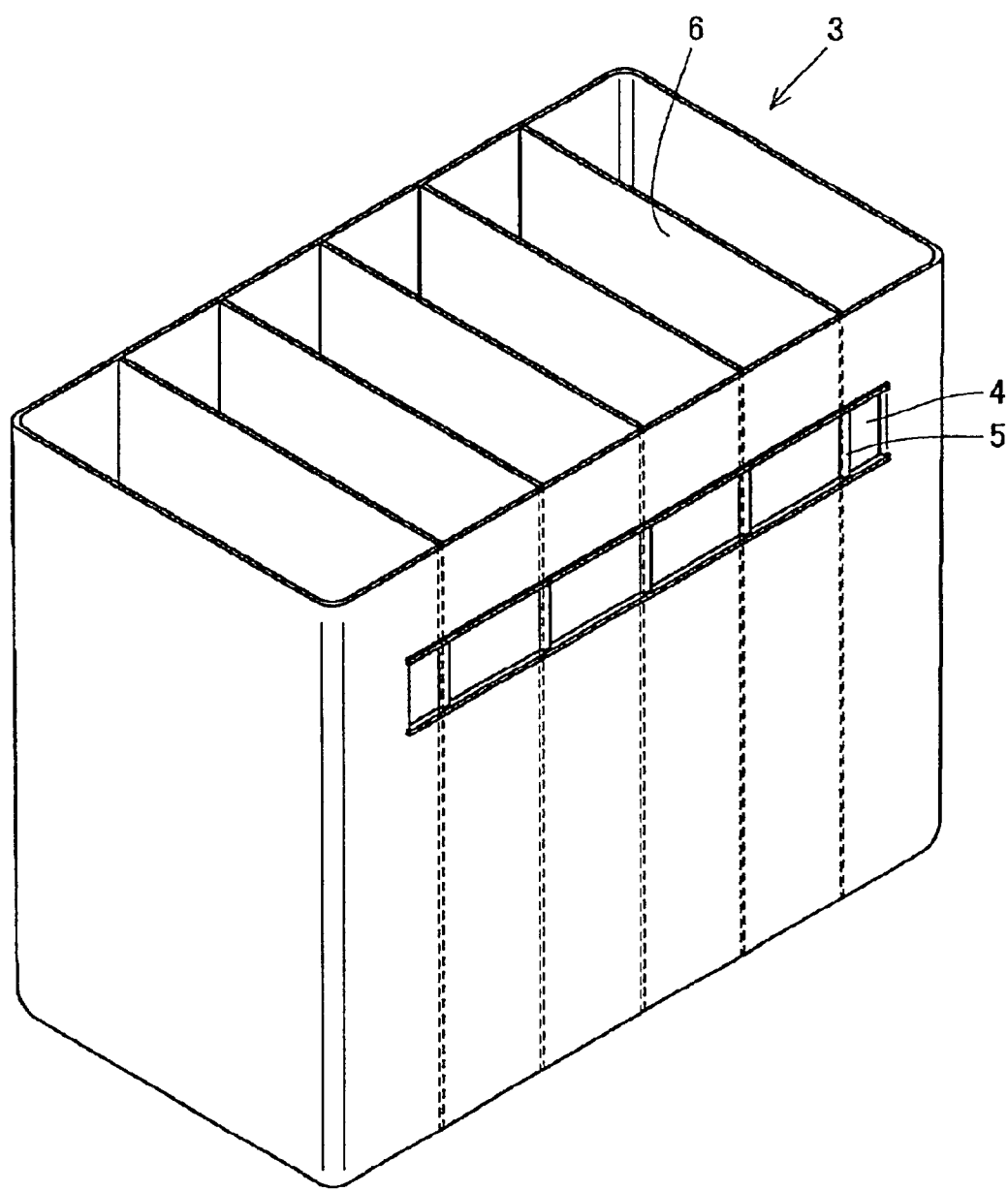
FIG. 3 is a perspective view of the battery casing of the storage battery in accordance with a second embodiment of the present invention.

A second embodiment of the present invention will now be described with reference to FIG. 3. FIG. 3 is a perspective view showing battery casing 3 of storage battery 1 in accordance with the second embodiment.

As shown in FIG. 3, in see-through window portion 4, rib 5 may be provided only at a position that is in front of partition 6. In other words, rib 5 may be provided only at a position in alignment with partition 6, and not provided in see-through window portion 4 except that position. In this embodiment also, a material flow in a part to be see-through window portion 4 at the time of molding can be promoted, and in addition, see-through window portion 4 can be reinforced.

Third Embodiment

Figure 4:
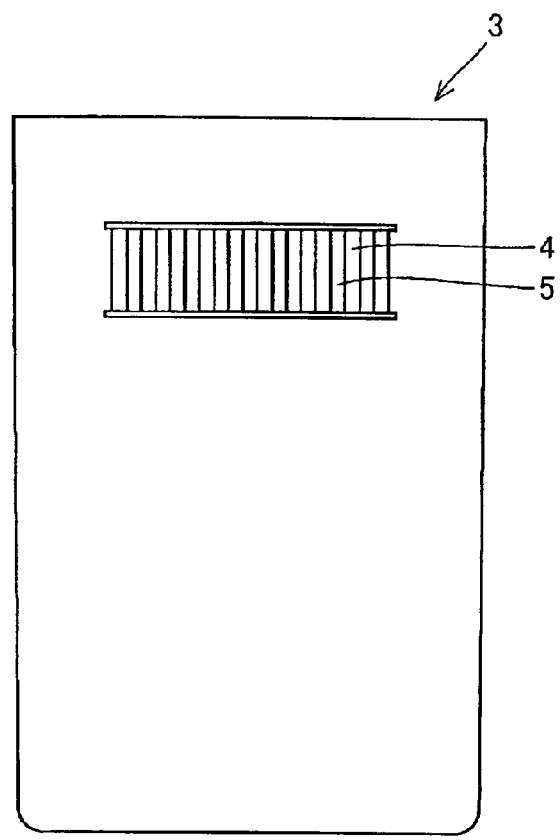
FIG. 4 is a side view of the battery casing of the storage battery in accordance with a third embodiment of the present invention.

A third embodiment of the present invention will now be described with reference to FIG. 4. FIG. 4 is a side view showing battery casing 3 of storage battery 1 in accordance with the third embodiment.

Although see-through window portion 4 is formed on a side surface having a relatively larger area (on the longer side) of the sidewalls of battery casing 3 in the above embodiments, see-through window portion 4 may be formed on a side surface having a relatively smaller area (on the shorter side) as shown in FIG. 4. In this embodiment also, a material flow in a part to be see-through window portion 4 at the time of molding can be promoted, and in addition, see-through window portion 4 can be reinforced.

It is noted that although description has been made to an example in which narrow ribs 5 are formed at regular intervals in see-through window portion 4, in the above embodiments, ribs of any other shape than that shown, e.g. in FIG. 1 may be selectively formed, or a thicker section may be selectively provided in place of the ribs, at see-through window portion 4, as long as such a rib can promote a material flow in a portion to be see-through window portion 4 at the time of molding and also can reinforce see-through window portion 4.

Furthermore, see-through window portion 4 may be provided only on one side surface of the battery casing as in the above-described embodiments, but rather may be provided on a plurality of side surfaces of the battery casing. For example, in the example in FIG. 1, see-through window portion 4 may be provided additionally on a side surface that is the rear side of battery casing 3. In this way, a level of electrolyte can be visually recognized from a plurality of directions.

In accordance with the present invention, a material flow in a portion to be a see-through window portion at the time of molding a battery casing can be better promoted than in a conventional example, so that the moldability of the battery casing can be improved. In addition, the strength of the see-through window portion at the time of releasing the battery casing from a mold can be improved, so that the see-through window portion can be prevented from deforming when the battery casing is released from a mold. As a result, it is possible to manufacture high-quality battery casings with less deformation at a high production yield.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A storage battery, comprising
a battery casing;
a cover closing an opening of said battery casing; and
a thinner see-through window portion provided on a sidewall of said battery casing for visual recognition, from the outside, of a level of electrolyte contained in said battery casing, wherein
a reinforcing rib is provided integral with said see-through window portion and extends through a see-through window portion displaced inwardly away from edges of said see-through window portion, wherein,
said battery casing has a plurality of cells and a partition separating said cells, and
said reinforcing rib is provided at a position in alignment with said partition.

2. The storage battery according to claim 1, wherein a plurality of said reinforcing ribs are provided at regular intervals, and said reinforcing rib extends parallel to a direction of height of said battery casing.

3. The storage battery according to claim 1, wherein the thickness of that part of said battery casing which is not provided with said see-through window portion is made equal to the thickness of that part of said see-through window portion which is provided with said reinforcing rib.

4. The storage battery according to claim 1, wherein said reinforcing rib is formed by selectively making thicker said see-through window portion.

5. The storage battery according to claim 1, wherein a side surface of said battery casing includes a first side surface having a relatively larger area and a second side surface having a relatively smaller area, and said see-through window portion is provided on at least one of said first and second side surfaces.

6. The storage battery according to claim 5, wherein said see-through window portion is provided on said first side surface.

7. The storage battery according to claim 5, wherein said see-through window portion is provided on said second side surface.

8. The storage battery according to claim 1, wherein said reinforcing rib lies on a common plane with said partition.

9. An electric storage battery comprising:

a battery case that has a top opening and that includes plural sidewalls bounding an interior space and plural partitions dividing said interior space into plural cells;

a battery cover that covers said top opening of said battery case;

wherein:

at least one windowed sidewall of said sidewalls respectively includes an opaque wall, a see-through window provided in said opaque wall, and plural reinforcing ribs provided spaced apart from one another on said see-through window;

said battery case is a single-piece integrally-molded unitary member integrally including said sidewalls and said partitions;

said see-through window is integrally molded as one integrally connected piece with said opaque wall and with at least one of said partitions;

said reinforcing ribs are integrally molded as one integrally connected piece with said see-through window; and at least one of said reinforcing ribs lies on an outer surface of said see-through window on a common plane with said at least one of said partitions.

10. The electric storage battery according to claim 9, wherein said see-through window spans a plurality of said cells.

11. The electric storage battery according to claim 9, wherein each one of said reinforcing ribs has see-through areas of said see-through window respectively on two lateral sides thereof.

12. The electric storage battery according to claim 9, including a same number of said reinforcing ribs as said partitions, wherein all of said reinforcing ribs are provided only at respective positions lying on respective common planes with all of said partitions.

13. The electric storage battery according to claim 9, including a greater number of said reinforcing ribs than said partitions, wherein some of said reinforcing ribs lie on respective common planes with said partitions, and some of said reinforcing ribs are parallel to and laterally offset from and not lying on common planes with any of said reinforcing ribs.

* * * * *

UNITED STATES PATENT AND TRADEMARK OFFICE
CERTIFICATE OF CORRECTION

PATENT NO.     : 6,872,488 B2
DATED          : March 29, 2005
INVENTOR(S)    : Tatsuyo Hirano et al.

It is certified that error appears in the above-identified patent and that said Letters Patent is hereby corrected as shown below:

<u>Column 4,</u>
Line 33, after "see-through" insert -- area of said see-through --
Line 35, after "portion," delete "wherein,"

Signed and Sealed this

Twelfth Day of July, 2005

JON W. DUDAS
*Director of the United States Patent and Trademark Office*